No. 871,197.  
PATENTED NOV. 19, 1907.  
W. ABEL, Jr.  
COMBINATION FRUIT JAR OPENER, TIGHTENER, AND PRESSER.  
APPLICATION FILED MAR. 4, 1907.
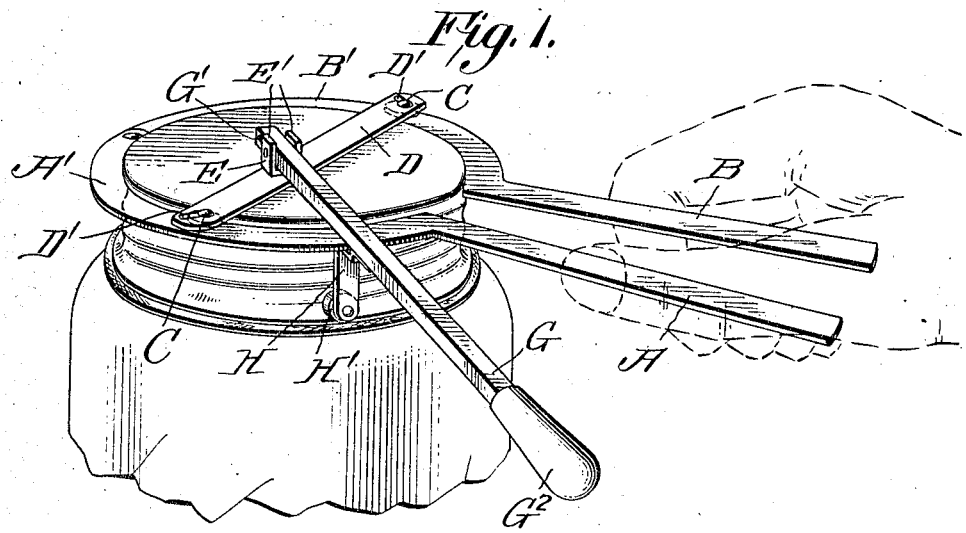
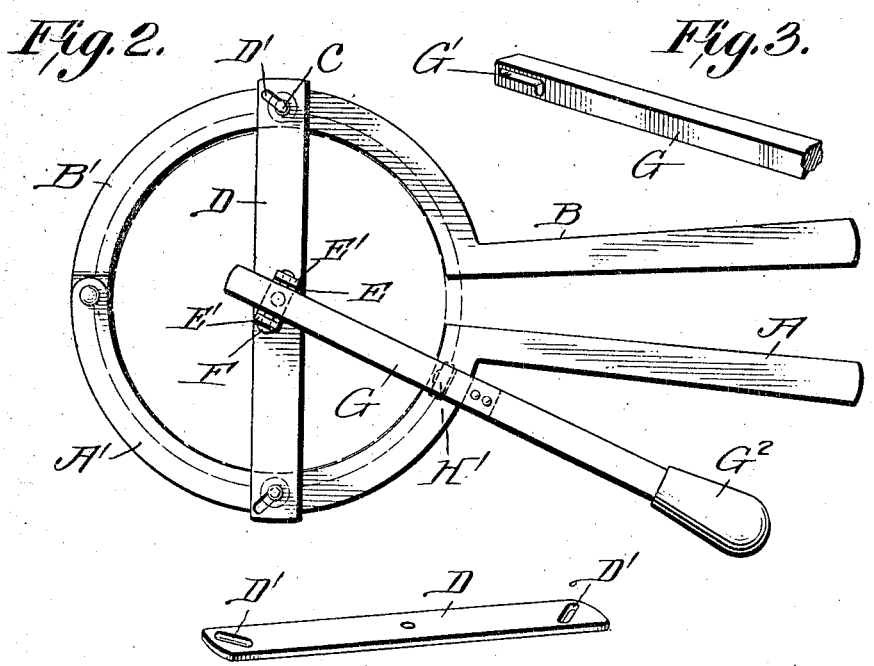

UNITED STATES PATENT OFFICE.

WILLIAM ABEL, JR., OF NORTH AMHERST, OHIO.

COMBINATION FRUIT-JAR OPENER, TIGHTENER, AND PRESSER.

No. 871,197.      Specification of Letters Patent.      Patented Nov. 19, 1907.

Application filed March 4, 1907. Serial No. 360,534.

*To all whom it may concern:*

Be it known that I, WILLIAM ABEL, Jr., a citizen of the United States, residing at North Amherst, in the county of Lorain and State of Ohio, have invented a new and useful Improvement in a Combination Fruit-Jar Opener, Tightener, and Presser, of which the following is a specification.

This invention relates to a combination fruit jar opener tightener and presser, the object being to provide the device with a pressing roller which will press the edge of the cover down tight on the rubber, so as to make the jar perfectly air tight.

Another object of my invention is to provide the opener with a pressing roller which will press the bends out of the cover which have been made by sticking a knife under the rubber which is the common way of letting air into the jar so that the cover can be removed.

With these and other objects in view, the invention consists in the novel features of construction, combination and arrangement of parts, hereinafter fully described and pointed out in the claims.

In the drawings forming a part of this specification:—Figure 1 is a perspective view of my improved jar opener, tightener and presser showing them applied to a jar. Fig. 2 is a top plan view of the opener tightener and presser. Fig. 3 is a perspective view of a portion of the lever. Fig. 4 is a perspective view of the jaw connecting link.

In the drawing A and B indicate a pair of handles provided with curved jaw portions A' B' having reduced apertured ends which are pivotally connected together by a rivet adapted to be clamped around the cover of a jar for removing the cover, or tightening the cover on the jar.

Oppositely disposed rivets C project upwardly from the curved jaws A' B' on which are mounted the obliquely slotted ends D' of a link D which limits the outwardly movement of the jaws and supports the jaws on the cover. Pivotally mounted centrally on the link D is a plate E provided with upwardly apertured projecting ends E' in which is secured a pin F on which is mounted the slotted end G' of a lever G, provided with a handle G² at its end so that it can be readily moved up or down and swung around the top of the jar. A bracket H is secured to the under side of the lever H carrying a roller H' at its lower end provided with a beveled rim adapted to bear against the flange of the cover and force the bends out of the same. The slot in the end of the lever is formed L-shaped so that when pressure is applied to the lever, the pin will drop into the vertical slot of the L-shaped slot, so as to hold the roller in position so that it will travel around on the edge of the cover. It will be readily seen that when it is desired to use the device as a jar opener or closer, the lever will be pulled out until the pin reaches the end of the slot so that the roller will be out of engagement with the cover.

From the foregoing description, it will be readily seen that I have provided a device which is very simple and cheap in construction and one which will press the bends out of tops which would have to be thrown away and make them fit snugly on the jar.

Having thus fully described my invention, what I claim as new and desire to secure by Letters Patent is:—

1. A device of the kind described comprising clamping jaws carrying a link, a lever pivotally and slidably mounted on said link, and a pressing roller carried by said lever.

2. In a device of the kind described, the combination with a pair of pivoted jaws connected together by a link, of a lever pivotally and slidably mounted on said link, and a presser roller carried by said lever for the purpose described.

3. In a device of the kind described, the combination with a pair of curved jaws pivotally connected together provided with handles, of a link connecting said jaws, a lever pivotally mounted on said link, and a bracket secured to said lever carrying a presser roller for the purpose described.

4. A device of the kind described comprising a pair of clamping jaws pivotally connected together, a link connecting said jaws, and a lever loosely mounted on said link carrying a presser roller having a beveled rim for the purpose described.

5. A device of the kind described, comprising a pair of handles provided with curved jaws pivotally connected together, a link loosely mounted on said jaws, a plate pivotally mounted on said link provided with upwardly projecting apertured ends, a pin secured in said ends, a lever loosely mounted on said pin and a presser roller carried by said lever.

6. In a device of the kind described, the combination with a pair of clamping jaws pivotally connected together, of rivets extending upwardly from said jaws, a link provided with slotted ends mounted on said rivets, a plate pivotally mounted centrally on said link, a lever loosely mounted on said plate, and a bracket secured to said lever carrying a presser roller, for the purpose described.

7. In a device of the kind described, the combination with a pair of jaws pivotally connected together, of a link connecting said jaws, a plate pivotally mounted centrally on said link provided with upwardly projecting angled ends connected together by a pin, a lever provided with an L-shaped slot in its end mounted on said pin, a bracket secured to the under side of said lever, and a roller carried by said bracket provided with a beveled rim for the purpose described.

WILLIAM ABEL, Jr.

Witnesses:
  H. N. Steele,
  E. F. Steele.